March 15, 1949.                R. B. WILSON                2,464,362
                              SERVOMOTOR DAMPER
                            Filed June 28, 1945
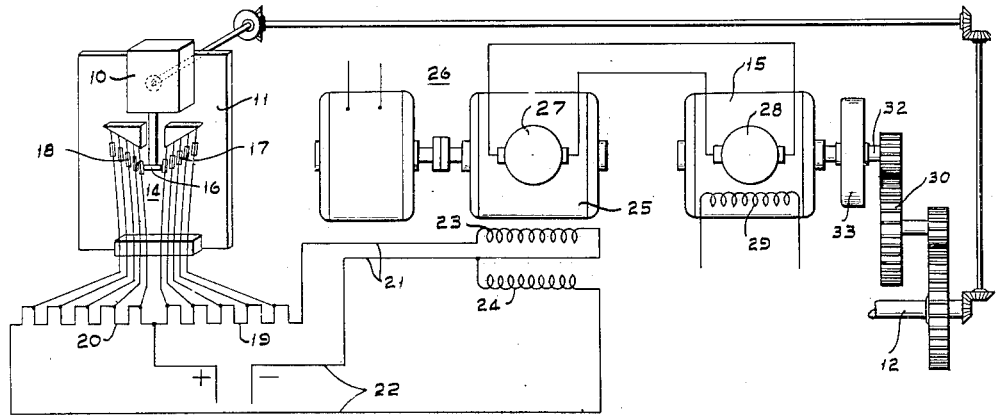
FIG. 1.
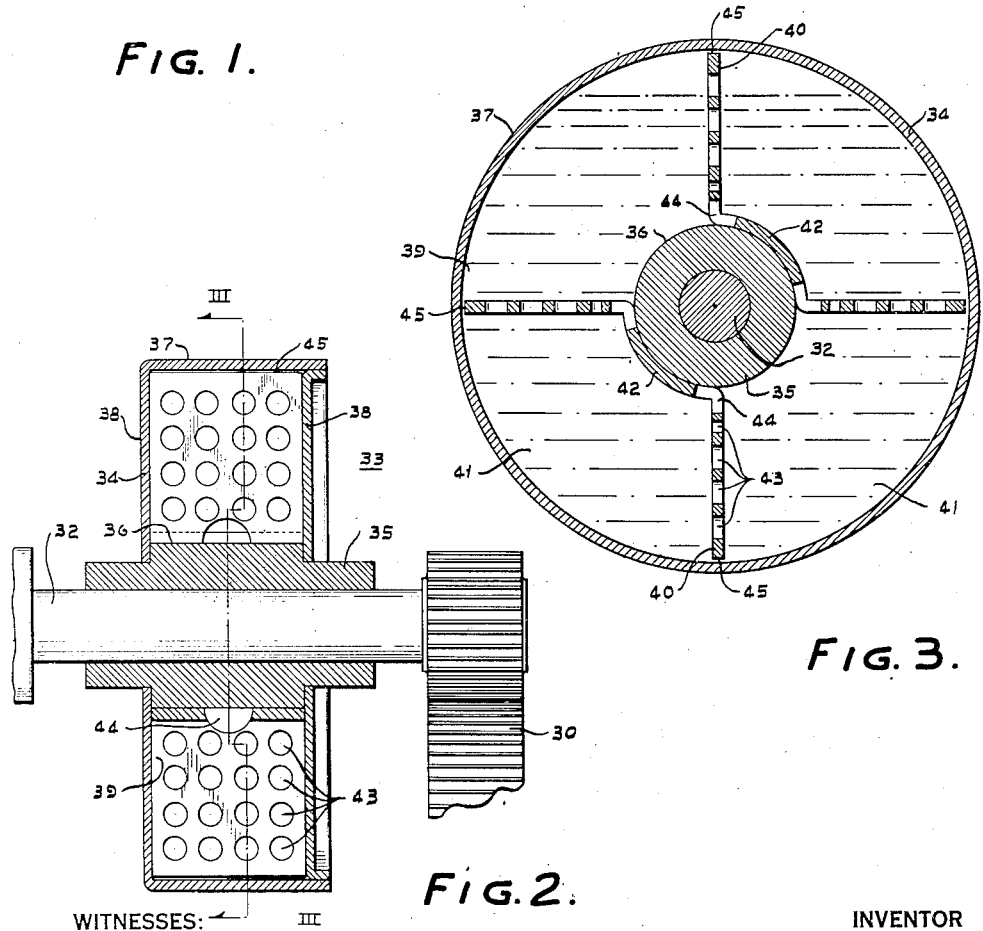
FIG. 2.
FIG. 3.
WITNESSES:
N. W. Novak
J. K. Mosser
INVENTOR
RICHARD B. WILSON
BY a. B. Reavis
ATTORNEY Patented Mar. 15, 1949

2,464,362

UNITED STATES PATENT OFFICE 2,464,362

SERVOMOTOR DAMPER

Richard B. Wilson, Springfield, Mass., assignor to Westinghouse Electric Corporation, East Pittsburgh, Pa., a corporation of Pennsylvania Application June 28, 1945, Serial No. 601,999

1 Claim. (Cl. 74—572)

The invention relates to a follow-up arrangement wherein displacement or deviation of follow-up means relative to a reference energizes a motor to drive a rotary system to move the follow-up means to restore the latter to its position relative to the reference, and it has for an object to provide an improved rotary damper for the motor and which damper is effective to dissipate vibrational energy of the rotary system by the orifice effect of a plurality of openings through which a suitably heavy liquid is constrained to flow due to its inertia.

In a follow-up arrangement, where follow-up means is caused to follow a reference by means of a reversible electric motor whose electrical input is controlled by displacement of the follow-up means relative to a reference and whose rotary mechanical output is used to operate the follow-up means, inertia of the rotary system necessarily introduces a deviation or phase difference as between the controlling impulse and the movement corresponding thereto and this results in undesired vibratory motion, particularly when the motor is suddenly accelerated or decelerated. In accordance with the present invention, the motor shaft carries a casing having an interior annular or toroidal chamber divided into a circumferential series of spaces by webs or vanes and a suitable heavy liquid, such as mercury, fills the divided annular chamber. Each vane provides for orificed communication between adjacent spaces and restricted flow of the liquid occurs through the orifices because of inertia. The liquid acts as a flywheel, not only to give smooth rotary motion, but, as the orifices provide for flow of liquid due to its inertia, the capacity exists for the dissipation of energy to damp or minimize oscillations. Accordingly, a further object of the invention is to provide a damper of this character having an annular or toroidal chamber divided by a plurality of vanes into a circumferential series of spaces, each vane having and defining a plurality of orifice openings, together with a heavy liquid, such as mercury, completely filling the divided annular chamber, and whose inertia is responsible for flow through the orifices during phases of acceleration and deceleration for dissipating energy.

A further object of the invention is to provide a damper for a member subject to variations in angular velocity and wherein the damper comprises a casing attached to the member and providing a toroidal chamber divided by radial partitions into a plurality of sector spaces with the spaces filled or nearly filled with heavy liquid and each partition having orifice openings which offer resistance to flow of liquid from space to space due to its inertia.

These and other objects are effected by the invention as will be apparent from the following description and claim taken in connection with the accompanying drawings, forming a part of this application, in which:

Fig. 1 shows diagrammatically a follow-up system with the improved damper applied thereto;

Fig. 2 is an enlarged axial sectional view of the damper; and

Fig. 3 is a sectional view taken along the line III—III of Fig. 2.

In Fig. 1, there is shown reference means 10, such as a gyro vertical, and follow-up means indicated diagrammatically by the members 11 and 12 which are mechanically connected to move angularly together. Pick-up means, at 14, senses displacement or deviation in position of the follow-up means relative to the reference to control a follow-up motor 15 to move the follow-up means to restore the latter to its position angularly matching the reference.

By way of example, the pick-up means, at 14, includes an actuator 16 connected to the reference and contacts 17 carried by the follow-up means and operable to effect voltage control of the motor 15. To this end, the contacts 17 and 18 are tapped along resistors 19 and 20 of the circuits 21 and 22, respectively, for the split or reversed field elements 23 and 24 of the generator 25 of the motor-generator set, at 26, the armature 27 of the generator being connected in series with the armature 28 of the follow-up motor 15 having the separately-excited field 29.

The follow-up motor 15 drives the follow-up means, including the mechanically-connected members 11 and 12, through reduction gearing 30. As shown, the motor is connected by the gearing to the operated member 12 and the member 11 is movable angularly with the latter, the member 11 carrying the gyro vertical 10 and the contacts 17 so that angular deviation of the follow-up means with respect to the reference is manifested as an angular movement or deviation of the member 11 with respect to the reference provided by the gyro vertical.

For any amplitude of movement of deviation or departure of the follow-up means relative to the reference, it is desirable that the follow-up motor 15 shall operate to keep the follow-up means matched angularly with the reference; however, because of inertia of the rotary system, a deviation or phase difference is necessarily introduced as between the controlling effect and the movement of the follow-up means pursuant thereto and the consequent hunting or vibratory action makes damping desirable.

In accordance with the present invention, a high-speed shaft of the rotary system, for example, the follow-up motor shaft 32, has secured thereto the rotary damper, at 33, which is effective to smooth out sudden accelerations and retardations and to provide for energy dissipation and minimizing of vibrations.

The damper, at 33, includes an annular structure 34 secured to a hub 35 attached in any suitable manner to the shaft 32. The annular structure 34 comprises inner and outer circumferential walls 36 and 37 joined by side walls 38 to form the interior annular or toroidal chamber 39 of rectangular section. The annular chamber 39 is divided by a suitable number of webs or partitions 40 into a series of circumferential sector spaces 41. As shown, there are four vanes 40 equidistantly spaced to divide the annular chamber into quadrantal spaces 41. To facilitate manufacture, the vanes are preferably formed by unit structures including a pair of vanes 40 connected by an inner arcuate structure 42 fitting the outer surface of the inner wall 36 and spot-welded to the latter.

The divided chamber 39 is filled, or nearly filled, with heavy liquid, such as mercury. Each vane 40 has a plurality of orifice openings 43 and an orifice opening 44 therein, and preferably also each vane defines a narrow clearance 45 with respect to the outer peripheral wall 37 serving as an orifice opening. Each opening 44 is intersected by the junction of its vane 40 with the arcuate structure 42, with the result that a dead layer of liquid next to the hub is avoided. The orifice openings function as submerged orifices through which flow occurs due to inertia for dissipation of energy. Using mercury as a heavy liquid, I have secured the best results where the aggregate orifice area is from twenty to twenty-five per cent of the vane area.

As the inertia of the damper should be of the same order as that of the motor rotor, its dimensions will depend upon the specific gravity of liquid used. The annular chamber is substantially filled with liquid, sufficient space remaining to accommodate for expansion of the liquid due to increases in temperature. If the annular chamber were not divided by the vanes, then the torque applied by the housing structure to rotate the liquid would depend upon the viscous friction of the latter, but such an arrangement would not provide adequate damping within reasonable structural dimensions. On the other hand, with the annular chamber divided by a solid partition, the housing structure and the liquid would behave as a solid flywheel and would merely increase the inertia and, therefore, accentuate hunting. By having a partition formed to provide orifices, the resistance set up by such orifices to the motion of liquid relative to the housing structure is effective to smooth out accelerations and retardations and to dissipate vibrational energy so as to minimize hunting.

In operation, if displacement of the follow-up means relative to the reference occurs, the follow-up motor 15 is energized for rotation at a speed and in a direction corresponding to the displacement or deviation and its direction. Inertia of the rotary system necessarily involves a lagging relation of its motion with respect to energization of the motor. Therefore, assuming that the follow-up means is moved back to its zero or mid position by the rotary system, the latter, instead of coming to a stop, overtravels; and overtravel effects displacement of the follow-up means in the opposite direction to reverse the motor, whereupon the rotary system operates in the other direction and overtravel again occurs. Without further stimulus, this to-and-fro hunting motion would continue until the vibrational energy is dissipated in friction; however, where the stimulus is more or less continuous, as would be the case where the apparatus is carried by a vibratory structure, such as a ship, and where its displacement depends upon angular displacement of the supporting structure or ship from the horizontal, it is necessary to introduce damping if the arrangement is to be at all effective to maintain the follow-up means substantially horizontal or in angularly matched relation with respect to the reference.

As the maximum velocity of vibratory motion, that is, of hunting, occurs when the displacement is zero, and, as the damper resistance varies as the square of the velocity, it will be apparent that the maximum of damping occurs at the right time to be most effective. Further, as the damping resistance depends upon the orifice resistance and as the latter varies as the square of the velocity, the velocity being proportional to the square root of the pressure drop, it will be apparent that damping is made independent of changes in viscosity of the liquid and, therefore, independent of temperature changes.

While the invention has been shown in but one form, it will be obvious to those skilled in the art that it is not so limited, but is susceptible of various changes and modifications without departing from the spirit thereof.

What is claimed is:

In a damper for a rotary body subject to changes in rotational velocity, a unitary annular structure rotatable with the body and defining an interior annular chamber coaxial with the axis of rotation of the body; said structure comprising a hub member, axially-spaced radial webs encompassing and connected to the hub member, and a cylindrical rim joining the peripheries of the webs; said hub member, the webs and the rim providing interior inner and outer cylindrical surfaces and radial side surfaces bounding said annular chamber; a pair of vane structures each including an inner arcute portion fitting the hub member circumferentially between the webs and welded to the former and each arcuate portion having vanes extending radially outwardly from the ends thereof and dividing the chamber into arcuate spaces, the arcuate connecting portions of the vane structures being of such arcuate length and being so spaced about the inner circumferential wall that the interior annular chamber is divided substantially into quadrantal spaces and each vane providing orifice openings affording communication between adjacent spaces with at least one of such openings being intersected by the junction of the vane with its arcuate connecting portion, and heavy liquid substantially filling the interior space of the divided annular chamber.

RICHARD B. WILSON.

REFERENCES CITED

The following references are of record in the file of this patent:

UNITED STATES PATENTS

| Number | Name | Date |
|---|---|---|
| 767,372 | Arcioni | Aug. 16, 1904 |
| 1,104,268 | Messiter | July 21, 1914 |
| 1,671,351 | Curtis | May 29, 1928 |
| 1,758,062 | Replogle | May 13, 1930 |
| 1,997,412 | Fischel | Apr. 9, 1935 |
| 2,115,086 | Riggs | Apr. 26, 1938 |

FOREIGN PATENTS

| Number | Country | Date |
|---|---|---|
| 639,057 | France | June 13, 1928 |